United States Patent [19]
Ito et al.

[11] Patent Number: 5,930,582
[45] Date of Patent: Jul. 27, 1999

[54] RARE EARTH-IRON-BORON PERMANENT MAGNET AND METHOD FOR THE PREPARATION THEREOF

[75] Inventors: Masaru Ito; Ken Ohashi; Yoshio Tawara; Tadao Nomura; Takehisa Minowa, all of Fukui-ken, Japan

[73] Assignee: Shin-Etsu Chemical Co., Ltd., Japan

[21] Appl. No.: 09/217,207

[22] Filed: Dec. 22, 1998

[30] Foreign Application Priority Data

Dec. 22, 1997 [JP] Japan ..................................... 9-352758

[51] Int. Cl.$^6$ ................. B22F 3/12; B22F 1/00
[52] U.S. Cl. ................. 419/32; 419/33; 419/38
[58] Field of Search ................. 419/32, 33, 38

[56] References Cited

U.S. PATENT DOCUMENTS

| | | | |
|---|---|---|---|
| 4,992,234 | 2/1991 | Ohashi et al. | 419/23 |
| 4,996,023 | 2/1991 | Flipse et al. | 419/12 |
| 5,091,020 | 2/1992 | Kim | 148/101 |
| 5,098,649 | 3/1992 | Matsumoto et al. | 419/48 |
| 5,143,560 | 9/1992 | Doser | 148/101 |
| 5,167,914 | 12/1992 | Fujimura et al. | 419/11 |
| 5,443,787 | 8/1995 | Mori et al. | 419/32 |

*Primary Examiner*—Daniel J. Jenkins
*Attorney, Agent, or Firm*—Wenderoth, Lind & Ponack, L.L.P.

[57] ABSTRACT

Disclosed is a method for the preparation of a novel composite rare earth-based magnetically anisotropic sintered permanent magnet in which: (a) a base alloy consisting of a host phase of $R_2T_{14}B$ (R: a rare earth element; T: iron or a combination of iron and cobalt) having a particle diameter of 2 to 10 $\mu$m and containing in each particle a phase rich in the content of T and having a particle diameter not exceeding 1 $\mu$m is prepared by the strip casting method; (b) the base alloy is crushed; (c) the base alloy powder is blended in a specified proportion with a powder of an auxiliary alloy of R-T or R-T-B in a specified proportion; (d) the powder blend is subjected to further comminution; (e) the comminuted powder blend is subjected to compression-molding in a magnetic field into a powder compact; and (f) the powder compact is sintered by a heat treatment.

9 Claims, No Drawings

RARE EARTH-IRON-BORON PERMANENT MAGNET AND METHOD FOR THE PREPARATION THEREOF

BACKGROUND OF THE INVENTION

The present invention relates to a rare earth-based permanent magnet containing a rare earth element, iron and boron as the essential constituents and a method for the preparation thereof.

As is well known, rare earth-based magnetically anisotropic permanent magnets of R-T-B type, in which R is a rare earth element and T is iron or a combination of iron and cobalt, are now widely employed in the fields of electric and electronic instruments by virtue of their excellent magnetic properties and inexpensiveness for their high magnetic performance.

While the magnetically anisotropic rare earth-based permanent magnets of the above mentioned type are usually prepared by the sintering method in which particles of the magnetic alloy are compression-molded into a powder compact in a magnetic field to align the alloy particles relative to the easy magnetization axes of the particles and the powder compact is subjected to a heat treatment to effect sintering, the rare earth-based alloy powder is prepared by the melt-pulverization method or by the direct reduction-diffusion method. In the former method, the constituent elements each in the metallic or elementary form taken in a specified proportion are melted together into an alloy melt which is cast into an ingot to be pulverized. In the latter method, the starting materials including an oxide of the rare earth element, powder of iron and powder of a ferroboron taken in a specified proportion are thoroughly blended with further admixture of a powder of metallic calcium as the reducing agent and the powder blend is subjected to a heat treatment to effect the reducing reaction of the rare earth oxide with calcium and simultaneous diffusion thereof with the particles of iron and/or ferroboron.

Though advantageous in respect of the easy controllability of the alloy composition obtained by the method, the melt-pulverization method has disadvantages that mefting of the constituents must be carried out at a high temperature under a strictly controlled inert gas atmosphere and the rare earth metal as one of the starting materials is relatively expensive. Further, the alloy particles obtained by this method have a problem that the alloy has a metallographic structure containing an incipient crystalline phase of iron precipitated in the course of casting along with segregation of a phase rich in the content of the rare earth element.

In contrast thereto, the direct reduction-diffusion method is advantageous because the rare earth oxide as one of the starting materials is relatively inexpensive as compared with the rare earth metal, the reaction temperature can be relatively low and the alloy as the reaction product is obtained in the form of a powder so that the process of crushing into a coarse powder can be omitted. On the other hand, this method has some problems that the alloy composition can be controlled only with difficulties and the oxygen content of the alloy is liable to be increased by the washing treatment of the reaction product with water undertaken in order to remove the unreacted calcium metal or calcium oxide formed as a reaction product of the reducing reaction. Further, as an inherence of the method for the formation of an intermetallic compound, each of the particles of the host phase $R_2Fe_{14}B$ is surrounded by a layer of an auxiliary phase rich in the content of the rare earth element which is more susceptible to oxidation than the host phase to cause uncontrollable variation of the magnetic properties of the magnets prepared from the alloy powder though somewhat advantageous relative to the problem of segregation as compared with the melt-pulverization method.

It is generally understood that the magnetic properties of a permanent magnet of the R-Fe-B type can be improved by increasing the fraction of the magnetically hard host phase of $R_2Fe_{14}B$. In the melt-pulverization method, however, an alloy composition approximating the composition of the host phase $R_2Fe_{14}B$ has another problem that segregation of the coarse incipient crystalline phase of iron and the rare earth-rich phase is increased along with an increased difficulty in the pulverization of the alloy ingot.

As a solution of the above mentioned problems, the two-alloy method is proposed, in which a powder blend is prepared from a principal alloy from which the ferromagnetic host phase of $R_2Fe_{14}B$ is formed and an auxiliary alloy rich in the content of the rare earth element, which serves to promote sintering of the powder compact and exhibits a cleaning effect on the surface of the host phase particles, and the powder blend is further pulverized and subjected to a sintering treatment in a conventional manner. In this two-alloy method, it is important to undertake homogenization of the alloy by a heat treatment at an appropriate temperature in order to reduce segregation of coarse incipient crystals of iron in the alloy for the formation of the host phase.

With an object to prevent growth of the crystal grains and precipitation and growth of the incipient iron crystals as the defects of the melt-pulverization method, the so-called strip-casting method has been developed in which a melt of the alloy is ejected onto the surface of a rotating roller consisting of a single roller or twin rollers of copper so as to give a thin alloy ribbon formed by quenching of the melt. In this strip-casting method, various factors affecting the rate of solidification of the alloy melt including revolution of the quenching roller, rate of melt ejection and atmosphere inside the cooling chamber can be controlled so as to prevent occurrence of coarse incipient crystals of iron and to accomplish a thin alloy ribbon of the uniform host phase of $R_2Fe_{14}B$ having an adequate particle diameter.

As a method for the preparation of a magnetically isotropic rare earth-based permanent magnet, the so-called melt-spun method is proposed, in which, similarly to the above described strip-casting method, a melt of the alloy is ejected onto the surface of a quenching roller consisting of a single roller or twin rollers to give a thin alloy ribbon. Different from the strip-casting method, the rate of solidification of the alloy melt in the melt-spun method is much greater than in the strip-casting method so that the thin alloy ribbon obtained by this method has an amorphous or microcrystalline structure. An isotropic permanent magnet is obtained by subjecting the alloy in the form of a thin alloy ribbon to a heat treatment under appropriate conditions to effect crystal growth of the $R_2Fe_{14}B$ phase as the host phase exhibiting a coercive force.

This method is applied in recent years to the preparation of a composite magnet material consisting of a combination of a magnetically hard phase of $R_2Fe_{14}B$ and a magnetically soft phase of Fe or $Fe_3B$. In these composite magnetic materials, the magnetically hard and soft phases are dispersed each in the other in a fineness of nanometer order dimensions entering magnetic exchange coupling so that the demagnetization curve of the magnet resembles that obtained with a single magnetically hard phase. The magnet of this type is sometimes called an exchange spring magnet since the magnetization of the magnet along the demagnetization curve on the hysteresis loop exhibits a unique and unordinary behavior of irreversible spring-back as the external magnetic field is decreasing.

As a result of the above described various improvements, the rare earth-based magnetically anisotropic sintered permanent magnets, now expected to be under mass production in the near future, have been upgraded so as to have a maximum energy product $(BH)_{max}$ of as large as 50 MGOe approaching the theoretical upper limit of 64 MGOe. Since the principal phase of those magnets is $R_2Fe_{14}B$ having a low saturation magnetization as compared with iron per se and the like, however, it is generally understood that improvements in the magnetic properties of the magnets of this type will shortly get at a limiting bar hardly surpassed in practice.

Since the exchange-spring magnet described above contains, besides the host phase of $R_2Fe_{14}B$, phases having a higher saturation magnetization such as Fe and $Fe_3B$, on the other hand, the magnet has a potentiality of exhibiting superior magnetic properties but the phase of $R_2Fe_{14}B$, which is formed by a heat treatment of the alloy obtained by the melt-spun method, is isotropic with randomly oriented easy magnetization axes of the magnetic particles. This is the reason for the failure of obtaining a high-performance, magnetically anisotropic permanent magnet like a sintered magnet.

SUMMARY OF THE INVENTION

The present invention accordingly has an object, by overcoming the above described problems and disadvantages in the prior art, to provide a novel rare earth-based high-performance, magnetically anisotropic exchange-spring permanent magnet of the R-Fe-B type and a method for the preparation thereof.

Thus, the rare earth-based permanent magnet of the rare earth-iron-boron type provided by the invention has a composite structure consisting of a host phase expressed by the formula $R_2T_{14}B$, in which R is a rare earth element selected from the group consisting of yttrium and the elements having an atomic number of 57 to 71 or, preferably, neodymium and T is iron or a combination of iron and cobalt, containing a second phase rich in the content of or containing, preferably, at least 60% by weight of iron, cobalt or an alloy of iron and cobalt dispersed within the host phase in the form of particles having a particle diameter not exceeding 1 μm, which is preferably magnetically anisotropic with aligned orientation of the easy magnetization axes of the magnetic particles.

In particular, the atomic % fractions of the respective constituents in the magnet include preferably from 6 to 15 atomic % of the rare earth element, from 70 to 92 atomic % of iron, from 0.1 to 40 atomic % of cobalt and from 1 to 10 atomic % of boron.

The method of the invention for the preparation of a rare earth-based anisotropic sintered permanent magnet defined above comprises the steps of:
(a) ejecting a melt of a base alloy consisting of from 6 to 12 atomic % of a rare earth element, from 70 to 95 atomic % of iron, from 0.01 to 40 atomic % of cobalt and from 1 to 10 atomic % of boron onto the surface of a rotating roller at a peripheral velocity of, preferably, from 0.5 to 40 meters/second to give a solid alloy having a composite structure consisting of a host phase expressed by the formula $R_2T_{14}B$, in which R is a rare earth element selected from the group consisting of yttrium and the elements having an atomic number of 57 to 71 and T is iron or a combination of iron and cobalt, containing a second phase rich in the content of iron, cobalt or an alloy of iron and cobalt dispersed within each particle of the host phase in the form of particles having a particle diameter not exceeding 1 μm by solidification of the alloy melt under a pressure, preferably, not exceeding the atmospheric pressure, though not particularly limitative thereto;
(b) pulverizing the alloy prepared in step (a) into a first alloy powder;
(c) blending the first alloy powder with a second powder of an auxiliary alloy having a melting point lower than that of the first alloy powder selected from the group consisting of R-T alloys, R-T-B alloys and R-T-M-B alloys, R and T each having the same meaning as defined before and M being an additive element selected from the group consisting of aluminum, silicon, titanium, vanadium, chromium, nickel, copper, zirconium, niobium, molybdenum, hafnium, tantalum and tungsten, to give a powder blend;
(d) subjecting the powder blend to comminution;
(e) compression-molding the powder blend after comminution in step (d) in a magnetic field to give a powder compact; and
(f) subjecting the powder compact to a heat treatment to effect sintering.

DETAILED DESCRIPTION OF THE PREFERRED EMBODIMENTS

The rare earth-based permanent magnet of the present invention is prepared by the method comprising the steps of: preparing a particulate base alloy consisting of the magnetically hard phase of an intermetallic compound of the formula $R_2T_{14}B$ having a particle diameter of 2 to 10 μm and containing a magnetically soft phase sporadically distributed within the host phase particles with nanometer-order fineness by utilizing the strip-casting method; blending a powder of the base alloy with a powder of an auxiliary alloy having a lower melting point and containing a phase rich in the content of the rare earth element to give a powder blend; comminuting the powder blend; compression-molding the powder blend in a magnetic field to give a powder compact; and sintering the powder compact.

The method of the invention is characterized by the features given below.

Firstly, the base alloy is prepared from an alloy melt of a specified composition by the strip-casting method in the form of a thin alloy ribbon consisting of the magnetically hard host phase of $R_2T_{14}B$ having a particle diameter of 2 to 10 μm and containing a magnetically soft phase, of which the content of iron, cobalt or a combination of iron and cobalt is at least 60% by weight, referred to as the T'-rich phase hereinafter, dispersed within the host phase in nanometer order fineness.

Secondly, the base alloy obtained as mentioned above in the form of a thin ribbon is pulverized and the powder is blended with a second powder of an auxiliary alloy having a lower melting point. The powder blend is subjected to the conventional two-alloy method by compression-molding and sintering into a magnetically anisotropic sintered permanent magnet.

Thirdly, the thin alloy ribbon prepared by the strip-casting method contains the magnetically soft T'-rich phase dispersed within the magnetically hard phase of a high coercive force in nanometer order fineness so that magnetic exchange coupling is established between the magnetically hard and soft phases to give a high-performance magnetically anisotropic rare earth-based permanent magnet having a high saturation magnetization without decreasing the high coercive force possessed by the magnetically hard phase.

Following is a more detailed description of the inventive method for the preparation of the novel permanent magnet.

The starting step is for the preparation of the base alloy containing the host phase. The content of the rare earth element R in the base alloy is preferably in the range from 6 to 12 atomic %. When the content of the rare earth element is too low, the host phase of $R_2T_{14}B$, which supports the high coercive force of the magnet, is formed only insufficiently while, when the content of the rare earth element is too high, the fraction of the host phase $R_2T_{14}B$ is so great that the finely dispersed magnetically soft T'-rich phase can no longer be formed. The content of boron in the base alloy is preferably in the range from 1 to 10 atomic %. When the content of boron in the base alloy is too low, precipitation of the T'-rich phase cannot proceed so finely but to form coarse precipitates while, when the content of boron is too high, a paramagnetic phase is precipitated resulting in a decrease in the coercive force of the magnet. As to the constituent T, which is iron or a combination of iron and cobalt, the content of iron is preferably in the range from 70 to 95 atomic % and the content of cobalt is preferably in the range from 0.01 to 40 atomic %. When the content of the constituent T is too low, a paramagnetic phase is formed resulting in a decrease in the coercive force of the magnet while, when the content of the constituent T is too high, the proportion of the T'-rich phase relative to the host phase $R_2T_{14}B$ is unduly large resulting in an increase in the melting point of the alloy and formation of coarse precipitates although the saturation magnetization of the permanent magnet can be increased.

In the next place, a melt of the base alloy is ejected onto the surface of a rotating quenching roller consisting of a single roller or twin rollers to give a thin ribbon of the quenched alloy by the strip-casting method. The peripheral velocity of the quenching roller in this case is preferably in the range from 0.5 to 40 meters/second. When the peripheral velocity of the quenching roller is too low, the solidification rate of the alloy melt is accordingly so low that the T'-rich phase is precipitated not in nanometer order fineness but as coarse incipient crystals which cannot pertain to the magnetic exchange coupling with the magnetically hard phase. When the peripheral velocity of the quenching roller is too high, on the other hand, the magnetically soft phase can be precipitated with sufficient fineness but the particle size of the magnetically hard phase of $R_2T_{14}B$ is simultaneously so decreased that the subsequent pulverization treatment of the particles cannot comminute the particles into fineness corresponding to the size of the single magnetic domains resulting in an insufficient alignment of the particles in the compression-molding in a magnetic field not to accomplish high magnetic anisotropy of the magnet. Solidification of the alloy melt in this strip-casting method is effected in an atmosphere usually under the atmospheric pressure, though not particularly limitative thereto.

Separately, the auxiliary alloy is prepared by melting together the respective constituents each in the metallic or elementary form taken in a specified proportion. The auxiliary alloy should preferably have a melting point lower than that of the base alloy and selected from the group consisting of R-T alloys, R-T-B alloys and R-T-M-B alloys, in which R, T, M and B each have the definition given before.

The melting point of the auxiliary alloy is decreased in each of the above mentioned types as the content of the rare earth element R is increased and the melting point is increased as the content of the constituent T, i.e. iron or a combination of iron and cobalt, is increased. A too high content of boron in the alloy results in the precipitation of a paramagnetic phase consequently with a decrease in the magnetic properties of the magnet. While the element M has an effect to increase the coercive force of the sintered magnet prepared with the auxiliary alloy, an excessive amount of boron may form an alloy with the other elements in the base alloy consequently leading to a decrease in the proportion of the magnetically hard host phase of $R_2T_{14}B$ resulting in a decrease in the saturation magnetization of the sintered magnet. In this regard, the auxiliary alloys of the respective types should have a composition consisting of from 12 to 80 atomic % of the rare earth element R and the balance of the constituent T for the R-T alloys, from 12 to 80 atomic % of the rare earth element R, 10 atomic % or less of boron and the balance of the constituent T for the R-T-B alloys and from 12 to 80 atomic % of the rare earth element R, 10 atomic % or less of boron, 5 atomic % or less of the element M and the balance of the constituent T for the R-T-M-B alloys. The auxiliary alloy can be used as cast but higher uniformity with less segregation of the alloy can be ensured by using a quenched thin ribbon of the alloy prepared by the strip-casting method.

In the next place, each of the base alloy and the auxiliary alloy is subjected to crushing under an atmosphere of an inert gas such as nitrogen and argon. If either or both of these alloys can hardly be crushed depending on the composition thereof, the difficulty can be overcome by subjecting the alloy first to a hydrogenation treatment and then to a dehydrogenation treatment to regain the alloy. In particular, the hydrogenation treatment is carried out at a temperature of 0 to 50° C. under a hydrogen pressure of 1.5 to 3 atmospheres for 0.5 to 10 hours and the dehydrogenation treatment is carded out at a temperature of 200 to 600° C. under vacuum for 0.5 to 10 hours.

Thereafter, the base alloy and the auxiliary alloy are crushed separately each into coarse particles or granules by using a crushing machine such as a jaw crusher. Thereafter, the coarse powders are blended in a specified proportion to give a powder blend having an overall composition consisting of, preferably, from 6 to 15 atomic % of the rare earth element, from 70 to 92 atomic % of iron, from 0.1 to 40 atomic % of cobalt, from 1 to 10 atomic % of boron and the balance, if any, of the element M. A proper formulation of the composition of the powder blend satisfying these ranges ensures full sintering and a high residual magnetization.

In the next place, the powder blend prepared as above is subjected to comminution using a pulverizing machine such as ball mills and jet mills into a fine powder having a particle diameter in the range from 1 to 10 $\mu$m which corresponds to the size of the single magnetic domains of the host phase of $R_2T_{14}B$.

The step to follow is compression molding of the finely comminuted powder blend of the alloys into a powder compact in a magnetic field for alignment of the alloy particles. The compression molding is performed preferably in a magnetic field of 5 to 15 kOe under a compressive molding pressure of 300 to 2000 kgf/cm$^2$.

The powder compact as a green body is subjected to sintering in an inert atmosphere of argon or under vacuum at a temperature in the range from 1050 to 1200° C. to give a sintered permanent magnet material. When the sintering temperature is too low, the sintered body cannot be imparted with a fully increased density consequently resulting in a decrease in the coercive force of the magnet while, when the sintering temperature is too high, an excessive growth is caused in the particle size of the $R_2T_{14}B$ phase also resulting in a consequent decrease in the coercive force of the magnet.

In the following, particular embodiments of the invention are illustrated in more detail by way of Examples, which, however, never limit the scope of the invention in any way.

EXAMPLE 1

A rare earth-based alloy consisting of 10.5 atomic % of neodymium, 83.0 atomic % of iron, 1.0 atomic % of cobalt and 5.5 atomic % of boron was prepared by melting together the respective elements each in the metallic or elementary form in a high-frequency induction furnace. An approximately 1 kg portion of the alloy was taken in a fused silica glass tube having a 1 mm by 35 mm slit at the bottom and heated by high-frequency induction heating in an atmosphere of argon under a pressure of 260 mmHg. When the temperature of the alloy melt had reached 1350° C., the melt surface was pressurized with argon gas and the melt was ejected onto the surface of a copper roller rotating at a peripheral velocity of 10 meters/second out of the slit held at a height of 2 mm above the roller surface to give a thin quenched alloy ribbon having a width of 10 to 15 mm and a thickness of 50 to 100 $\mu$m. As examined on an EPMA, the thin alloy ribbon had a structure consisting of the phase of $Nd_2T_{14}B$ having a particle diameter of 2 to 5 $\mu$m, each particle containing fine precipitates of a T-rich phase having a particle diameter not exceeding 0.5 $\mu$m.

The thin alloy ribbons were subjected to a hydrogenation treatment at 20° C. for 2 hours under a hydrogen pressure of 2 atmospheres and then to a dehydrogenation treatment at 500° C., for 4 hours under vacuum and then crushed in a jaw crusher and a Brown mill into a coarse powder of the base alloy having an average particle diameter of 500 $\mu$m.

Separately, a coarse powder of an auxiliary alloy having an average particle diameter of 400 $\mu$m was prepared by crushing an alloy consisting of 45 atomic % of neodymium, 13 atomic % of dysprosium, 15 atomic % of iron, 23 atomic % of cobalt, 1 atomic % of boron, 2 atomic % of copper and 1 atomic % of aluminum by using a jaw crusher and a Brown mill.

A powder blend consisting of 88% by weight of the base alloy powder and 12% by weight of the auxiliary alloy powder prepared by using a V-blender machine was subjected to comminution by using a jet mill into fine particles having an average particle diameter of 3 $\mu$m. The thus obtained fine powder was subjected to compression molding under a molding pressure of 500 kgf/cm² in a magnetic field of 10 kOe into a powder compact which was subjected to a sintering treatment by heating at 1120° C., for 2 hours under vacuum to give a sintered magnetically anisotropic permanent magnet.

This magnetically anisotropic sintered permanent magnet had a coercive force of 3.1 kOe and a residual magnetization of 13.1 kG.

EXAMPLE 2

The experimental procedure was substantially the same as in Example 1 except that the base alloy was prepared from 9.0 atomic % of neodymium, 84.0 atomic % of iron, 1.0 atomic % of cobalt and 6.0 atomic % of boron.

The thus prepared magnetically anisotropic sintered permanent magnet had a coercive force of 2.5 kOe and a residual magnetization of 13.5 kG.

EXAMPLE 3

The experimental procedure was substantially the same as in Example 1 except that the base alloy was prepared from 8.5 atomic % of neodymium, 83.5 atomic % of iron, 1.0 atomic % of cobalt and 7.0 atomic % of boron.

The thus prepared magnetically anisotropic sintered permanent magnet had a coercive force of 2.9 kOe and a residual magnetization of 13.2 kG.

COMPARATIVE EXAMPLE 1

A base alloy, which consisted of the magnetically hard host phase of $Nd_2T_{14}B$ having an average particle diameter of 100 $\mu$m along with precipitates of a T-rich phase having an average particle diameter of 200 $\mu$m, was prepared in the same formulation as in Example 1.

This base alloy was crushed by using a jaw crusher and a Brown mill into a coarse powder from which, after comminution in a jet mill, a magnetically anisotropic sintered permanent magnet was prepared in the same manner as in the Examples excepting omission of admixture of the auxiliary alloy powder.

The thus prepared magnetically anisotropic sintered permanent magnet had a coercive force of 0.2 kOe and a residual magnetization of 6.5 kG.

COMPARATIVE EXAMPLE 2

The experimental procedure was substantially the same as in Comparative Example 1 described above except that the base alloy was prepared in the same formulation as in Example 2.

The thus prepared magnetically anisotropic sintered permanent magnet had a coercive force of 0.1 kOe and a residual magnetization of 5.5 kG.

COMPARATIVE EXAMPLE 3

The experimental procedure was substantially the same as in Comparative Example 1 described above except that the base alloy was prepared in the same formulation as in Example 3.

The thus prepared magnetically anisotropic sintered permanent magnet had a coercive force of 0.2 kOe and a residual magnetization of 6.3 kG.

What is claimed is:

1. A method for the preparation of a rare earth-based magnetically anisotropic sintered permanent magnet which comprises the steps of:

(a) ejecting a melt of a base alloy consisting of from 6 to 12 atomic % of a rare earth element, from 70 to 95 atomic % of iron, from 0.01 to 40 atomic % of cobalt and from 1 to 10 atomic % of boron onto the surface of a roller rotating at a peripheral velocity in the range from 0.5 to 40 meters/second to effect solidification of the melt giving a solidified base alloy in the form of a thin ribbon having a composite structure consisting of a host phase expressed by the formula $R_2T_{14}B$ having a particle diameter in the range from 2 to 10 $\mu$m, in which R is a rare earth element and T is iron or a combination of iron and cobalt, and a second phase containing at least 60% by weight of iron, cobalt or an alloy of iron and cobalt dispersed within each particle of the host phase of the formula $R_2T_{14}B$ in the form of particles having a particle diameter not exceeding 1 $\mu$m;

(b) crushing the base alloy prepared in step (a) into a first alloy powder;

(c) blending the first alloy powder with a second powder of an auxiliary alloy having a melting point lower than that of the first alloy powder selected from the group consisting of R-T alloys, R-T-B alloys and R-T-M-B alloys, in which R and T each have the same meaning as defined above and M is an element selected from the group consisting of aluminum, silicon, titanium, vanadium, chromium, nickel, copper, zirconium, niobium, molybdenum, hafnium, tantalum and tungsten, to give a powder blend;

(d) subjecting the powder blend to comminution;

(e) compression-molding the powder blend after comminution in step (d) in a magnetic field to give a powder compact; and (f) subjecting the powder compact to a heat treatment to effect sintering.

2. The method for the preparation of a rare earth-based magnetically anisotropic sintered permanent magnet as claimed in claim 1 in which the R-T alloy consists of from 12 to 80 atomic % of the rare earth element and the balance of the constituent T.

3. The method for the preparation of a rare earth-based magnetically anisotropic sintered permanent magnet as claimed in claim 1 in which the R-T-B alloy consists of from 12 to 80 atomic % of the rare earth element, 10 atomic % or less of boron and the balance of the constituent T.

4. The method for the preparation of a rare earth-based magnetically anisotropic sintered permanent magnet as claimed in claim 1 in which the R-T-M-B alloy consists of from 12 to 80 atomic % of the rare earth element, 10 atomic % or less of boron, 5 atomic % or less of the element M and the balance of the constituent T.

5. The method for the preparation of a rare earth-based magnetically anisotropic sintered permanent magnet as claimed in claim 1 in which the first alloy powder and the second alloy powder are blended in step (c) in such a proportion that the powder blend consists of from 6 to 15 atomic % of the rare earth element, from 70 to 92 atomic % of iron, from 0.1 to 40 atomic % of cobalt, from 1 to 10 atomic % of boron and the balance, if any, of the element M.

6. The method for the preparation of a rare earth-based magnetically anisotropic sintered permanent magnet as claimed in claim 1 in which comminution of the powder blend in step (d) is carried out such that the powder after comminution has a particle diameter in the range from 1 to 10 $\mu$m.

7. The method for the preparation of a rare earth-based magnetically anisotropic sintered permanent magnet as claimed in claim 1 in which crushing of the base alloy in the form of a thin ribbon in step (b) is preceded by a hydrogenation treatment and dehydrogenation treatment of the alloy.

8. The method for the preparation of a rare earth-based magnetically anisotropic sintered permanent magnet as claimed in claim 1 in which compression-molding of the powder blend in step (e) is carried out in a magnetic field in the range from 5 to 15 kOe.

9. The method for the preparation of a rare earth-based magnetically anisotropic sintered permanent magnet as claimed in claim 1 in which sintering of the powder compact in step (e) is carried out at a temperature in the range from 1050 to 1200° C.

* * * * *